United States Patent
Kim et al.

(10) Patent No.: US 10,026,937 B2
(45) Date of Patent: Jul. 17, 2018

(54) FRAME FOR SECONDARY BATTERY AND BATTERY MODULE COMPRISING THE SAME

(71) Applicant: LG CHEM, LTD., Seoul (KR)

(72) Inventors: Ki-Youn Kim, Daejeon (KR);
Jun-Yeob Seong, Daejeon (KR);
Young-Sop Eom, Daejeon (KR);
Sung-Chun Yu, Daejeon (KR); Dal-Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 207 days.

(21) Appl. No.: 15/028,764

(22) PCT Filed: Oct. 29, 2014

(86) PCT No.: PCT/KR2014/010253
§ 371 (c)(1),
(2) Date: Apr. 12, 2016

(87) PCT Pub. No.: WO2015/065044
PCT Pub. Date: May 7, 2015

(65) Prior Publication Data
US 2016/0254504 A1    Sep. 1, 2016

(30) Foreign Application Priority Data

Oct. 31, 2013 (KR) .................. 10-2013-0131169
Oct. 29, 2014 (KR) .................. 10-2014-0148143

(51) Int. Cl.
*H01M 2/10* (2006.01)
*H01M 10/04* (2006.01)
(Continued)

(52) U.S. Cl.
CPC ....... *H01M 2/1077* (2013.01); *H01M 2/1061* (2013.01); *H01M 10/0486* (2013.01);
(Continued)

(58) Field of Classification Search
CPC ............. H01M 2/1077; H01M 2/1061; H01M 10/0486; H01M 10/647; H01M 10/6557;
(Continued)

(56) References Cited

U.S. PATENT DOCUMENTS

| 2007/0072066 A1 | 3/2007 | Yoon et al. |
| 2007/0122695 A1 | 5/2007 | Kim et al. |

(Continued)

FOREIGN PATENT DOCUMENTS

| JP | 2011-14519 A | 1/2011 |
| KR | 10-2006-0072922 A | 6/2006 |

(Continued)

OTHER PUBLICATIONS

International Searching Report issued in PCT/KR2014/010253, dated Feb. 24, 2015.

*Primary Examiner* — Jane Rhee
(74) *Attorney, Agent, or Firm* — Birch, Stewart, Kolasch & Birch, LLP

(57) ABSTRACT

Disclosed are: a frame for secondary batteries, which ensures a channel around cooling plates stably to improve cooling efficiency for secondary batteries; and a battery module, a battery pack and a vehicle comprising the same. A frame for secondary batteries according to the present disclosure comprises: an upper cooling plate and a lower cooling plate having a plate shape and arranged to be spaced apart by a predetermined distance from each other facing each other; a main frame having four sides and configured to encompass the outer peripheral portions of the upper cooling plate and the lower cooling plate, to mount the outer peripheral portions of pouch-type secondary batteries thereto, and to enable two or more main frames to be stacked; and a support member arranged between the upper cooling plate and the lower cooling to support both cooling plates.

16 Claims, 6 Drawing Sheets

(51) Int. Cl.
*H01M 10/647* (2014.01)
*H01M 10/6557* (2014.01)
*H01M 10/6554* (2014.01)
*H01M 10/613* (2014.01)
*H01M 10/625* (2014.01)
*H01M 10/6555* (2014.01)

(52) U.S. Cl.
CPC ....... *H01M 10/613* (2015.04); *H01M 10/625* (2015.04); *H01M 10/647* (2015.04); *H01M 10/6554* (2015.04); *H01M 10/6555* (2015.04); *H01M 10/6557* (2015.04); *H01M 2220/20* (2013.01)

(58) Field of Classification Search
CPC ........... H01M 10/6554; H01M 10/613; H01M 10/625; H01M 10/6555; H01M 2220/20
See application file for complete search history.

(56) References Cited

U.S. PATENT DOCUMENTS

| | | |
|---|---|---|
| 2007/0285051 A1 | 12/2007 | Jeon et al. |
| 2009/0325043 A1 | 12/2009 | Yoon et al. |
| 2010/0310958 A1 | 12/2010 | Naito et al. |
| 2011/0059345 A1 | 3/2011 | Kim et al. |
| 2011/0293982 A1 | 12/2011 | Martz et al. |
| 2013/0045410 A1 | 2/2013 | Yang et al. |

FOREIGN PATENT DOCUMENTS

| | | |
|---|---|---|
| KR | 10-2007-0110565 A | 11/2007 |
| KR | 10-2011-0026048 A | 3/2011 |
| KR | 10-2011-0126764 A | 11/2011 |

FRAME FOR SECONDARY BATTERY AND BATTERY MODULE COMPRISING THE SAME

TECHNICAL FIELD

The present application claims the benefit of Korean Patent Application No. 10-2013-0131169 filed on Oct. 31, 2013 and Korean Patent Application No. 10-2014-0148143 filed on Oct. 29, 2014 with the Korean Intellectual Property Office, the disclosure of which is incorporated herein by reference in its entirety.

The present disclosure relates to a battery, and more particularly to a frame for secondary batteries, which is used in manufacturing a battery module comprising a plurality of secondary batteries, and a battery module comprising the same.

BACKGROUND ART

Currently, commercially available secondary batteries comprise nickel cadmium, nickel hydrogen, nickel zinc and lithium secondary batteries. Among them, lithium secondary batteries have drawn much attention because of little memory effect to allow unrestrained charging/discharging, as well as very low self-discharging rate and high energy density, compared to nickel-based secondary batteries.

For such secondary batteries, lithium-based oxides and carbon materials are mainly used respectively as positive electrode active materials and negative electrode active materials. A lithium secondary battery comprises an electrode assembly, which consists of a positive plate and a negative plate, with a separator therebetween, to which such positive electrode and negative electrode active materials are applied respectively, and an exterior material, i.e., a battery case, which stores and seals the electrode assembly along with an electrolyte.

Generally, lithium secondary batteries can be classified into a can-type secondary battery which integrates an electrode assembly into a metal can, and a pouch-type secondary battery which integrates an electrode assembly into a pouch made of an aluminum laminate sheet.

Recently, secondary batteries are widely used in middle- or large-sized devices like vehicles and power storage devices as well as small-sized devices like portable electronic appliance. When used in such middle- or large-sized devices, a plurality of secondary batteries are electrically connected in large numbers to increase the capacity and output. Especially, in such middle- or large-sized devices, pouch-type secondary batteries are usually employed because they can easily be stacked.

However, pouch-type secondary batteries are typically packaged in a battery case made of an aluminum/polymer resin laminate sheet, thus exhibiting insufficient mechanical rigidity. Therefore, when manufacturing a battery module with a plurality of pouch-type secondary batteries, frames are often employed to protect such secondary batteries from external shock, inhibit the movement thereof, and allow easy stacking.

Frames can be substituted for by other various terms such as cartridge, and are usually arranged in the shape of a rectangular plate with the center being empty, with the four sides encompassing the outer peripheral portions of pouch-type secondary batteries. In order to manufacture a battery module, a plurality of such frames are stacked and secondary batteries can be placed in inner empty spaces formed thereby.

On the other hand, when assembling a plurality of secondary batteries using such a plurality of frames, a plate-shaped cooling pin can be interposed between the plurality of secondary batteries. Secondary batteries may be used in high-temperature environment such as in summer, and may generate heat on their own. In this case, when a plurality of secondary batteries are stacked on each other, the temperature of secondary batteries can be increased higher; and if the temperature becomes higher than suitable levels, the performance of secondary batteries may be deteriorated, even with the risk of explosion or fire in worse cases. Therefore, when arranging a battery module, a cooling pin is usually interposed between secondary batteries to prevent a rise in the temperature of secondary batteries.

Such a cooling pin is plate-shaped to be called a cooling plate, which is placed between secondary batteries in a battery module to cool secondary batteries in various forms and manners. Among such forms and manners to cool secondary batteries, air-cooling is typically and widely used to lower the temperature of secondary batteries via heat exchange between a cooling plate and air by allowing external air to flow around the cooling plate.

For a battery module cooling secondary batteries through air-cooling, it is important to ensure a channel around cooling plates stably and thus allow external air to flow smoothly through such a channel. For conventional battery modules, however, it is difficult to ensure a channel around cooling plates stably. Especially, aluminum material is widely used in cooling plates, which are liable to deformations such as being pressed or warped while frames to stack are discharged during injection molding or coupled with other frames, or battery modules are used.

Such deformations of cooling plates may constrict or block a channel, disrupting the flow of external air through a channel and thereby deteriorating cooling efficiency for secondary batteries through cooling plates. While some configurations such as beads formed on cooling plates in order to prevent such deformations have been suggested, they still cannot ensure a channel stably because such beads themselves may also be deformed.

DISCLOSURE

Technical Problem

The present disclosure is designed to solve the problems of the related art, and therefore the present disclosure is directed to providing: a frame for secondary batteries, which ensures a channel around cooling plates stably to improve cooling efficiency for secondary batteries; and a battery module, a battery pack and a vehicle comprising the same.

The other objectives and advantages of the present disclosure can be understood with the following description and more clearly with the embodiments of the present disclosure. Also, it should easily be understood that the other objectives and advantages of the present disclosure can be implemented by the means described in the claims and the combinations thereof

Technical Solution

In one aspect of the present disclosure, there is provided a frame for secondary batteries according to the present disclosure comprising: an upper cooling plate and a lower cooling plate having a plate shape and arranged to be spaced apart by a predetermined distance from each other facing each other; a main frame having four sides and configured to encompass the outer peripheral portions of the upper cooling plate and the lower cooling plate, to mount the outer peripheral portions of pouch-type secondary batteries thereto, and to enable two or more main frames to be stacked; and a support member arranged between the upper cooling plate and the lower cooling plate to support both cooling plates.

Preferably, the main frame comprises openings formed in the side surfaces thereof to open at least a portion of an empty space between the upper cooling plate and the lower cooling plate.

Also preferably, the main frame is configured to mount one pouch-type secondary battery on an upper portion of the upper cooling plate, and another pouch-type secondary battery on a lower portion of the lower cooling plate.

Also preferably, the support member is configured to keep the distance between the upper cooling plate and the lower cooling plate within a predetermined range.

Also preferably, the support member is coupled by a coupling member with the upper cooling plate and the lower cooling plate.

Also preferably, the support member comprises a protrusion and the upper cooling plate and the lower cooling plate comprise holes formed therein, so that the protrusion is inserted and coupled with the holes to couple and fix the support member to the upper cooling plate and the lower cooling plate.

Also preferably, the support member is made of metal material or plastic material.

Also preferably, two or more of the support members are arranged.

Also preferably, the support member is formed to elongate in one direction.

Also preferably, at least a portion of the support member is arranged on the outer peripheral portions, where the main frame is placed, of the cooling plates.

Also preferably, at least one of the upper cooling plate and the lower plate is configured to comprise beads formed to protrude toward the other cooling plate.

Also preferably, the upper cooling plate and the lower cooling plate are made of aluminum material.

Also, the support member comprises the upper surface and the lower surface which are formed to be flat.

Also, the support member comprises an upper support part which is in contact with the lower surface of the upper cooling plate, a lower support part which is in contact with the upper surface of the lower cooling plate, and a connecting part which connects the upper support part and the lower support part to each other and has a thickness less than that of the upper support part and of the lower support part.

In order to achieve the foregoing objectives, a battery module according to the present disclosure comprises a frame for secondary batteries according to the present disclosure.

In order to achieve the foregoing objectives, a battery pack according to the present disclosure comprises a frame for secondary batteries according to the present disclosure.

In order to achieve the foregoing objectives, a vehicle according to the present disclosure comprises a frame for secondary batteries according to the present disclosure.

Advantageous Effects

The present disclosure gives the following effects. According to one aspect of the present disclosure, cooling plates can be arranged directly within frames, enabling the stacking of frames for secondary batteries for stacking when manufacturing a battery module, without any additional structure or process for interposing cooling plates between secondary batteries.

Therefore, according to such an aspect of the present disclosure, a battery module can be manufactured more easily using frames for secondary batteries for stacking, and the structure of a battery module can be simplified.

Also, according to one aspect of the present disclosure, two secondary batteries are stored in one frame for secondary batteries for stacking, and two cooling plates are interposed between such two secondary batteries. Therefore, it is possible to arrange one cooling plate for each secondary battery, improving cooling efficiency for secondary batteries.

Particularly, according to the present disclosure, a channel along which a fluid such as air or the like can flow is formed between two cooling plates, and such a channel comprises a support member to prevent the channel from being constricted and to inhibit warping of cooling plates due to the contraction of frames for secondary batteries, thereby maintaining the smooth flow of a fluid along the channel. Therefore, according to such an aspect of the present invention, cooling efficiency for a battery module can be ensured stably.

DESCRIPTION OF DRAWINGS

The accompanying drawings illustrate preferred embodiments of the present disclosure and, together with the foregoing disclosure, serve to provide further understanding of the technical features of the present disclosure. However, the present disclosure is not to be construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Mode for Disclosure

A frame for secondary batteries according to the present disclosure is used to manufacture a battery module by laminating and packaging a plurality of secondary batteries, and can hold secondary batteries to be prevented from moving and guide the assembling of secondary batteries.

Figure 1:
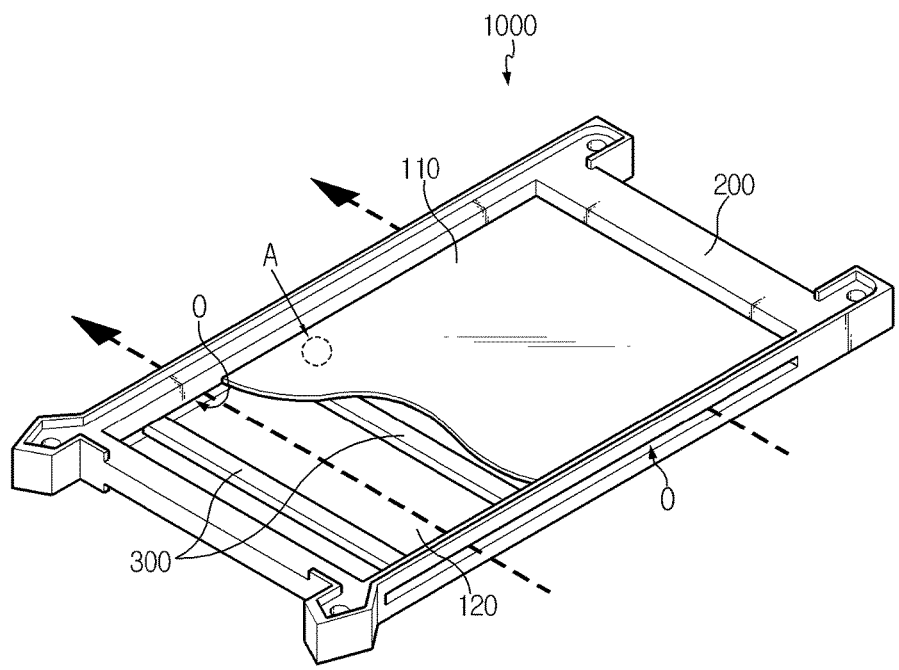
FIG. 1 is a schematic perspective view of a configuration of a frame for secondary batteries according to one embodiment of the present disclosure.
Figure 2:
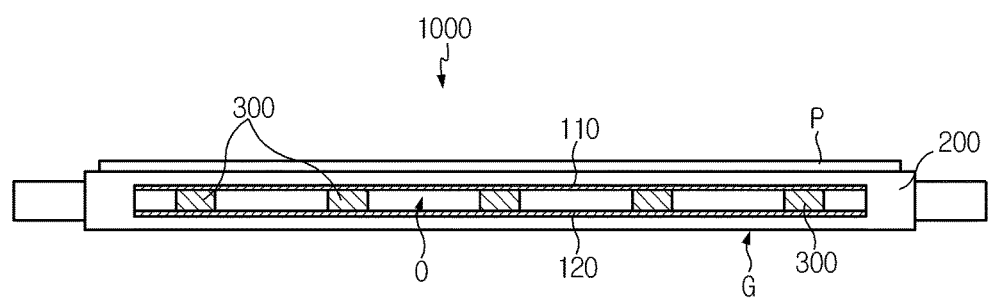
FIG. 2 is a right side view of the configuration of FIG. 1.

FIG. 1 is a schematic perspective view of the configuration of a frame for secondary batteries 1000 according to one embodiment of the present disclosure. FIG. 2 is a right side view of the configuration of FIG. 1. However, in FIG. 1, just for convenience of description, some portion of an upper cooling plate 110 is shown to be cut off.

With reference to FIG. 1 and FIG. 2, a frame for secondary batteries 1000 according to the present disclosure comprises an upper cooling plate 110, a lower cooling plate 120 and a main frame 200, and a support member 300.

The upper cooling plate 110 is configured to have a large plate form and arranged to lie for the larger surface thereof to face up and down. Particularly, an upper cooling plate 110 can be configured to a rectangular plate form.

The lower cooling plate 120 is configured to have a large plate form like the upper cooling plate 110, and can be formed in a shape to correspond to the shape of the upper cooling plate 110, for example, the same shape as that of the upper cooling plate 110. Particularly, a lower cooling plate 120 can be arranged below an upper cooling plate 110, so that the larger surface of the former can be faced mutually with the larger surface of the latter. Here, the lower cooling plate 120 can be arranged to be spaced apart by a predetermined distance from the upper cooling plate 110. Furthermore, a lower cooling plate 120 can be arranged to be parallel in the horizontal direction to an upper cooling plate 110.

The upper cooling plate 110 and the lower cooling plate 120 can respectively be made of thermally conductive material allowing heat exchange with secondary batteries placed above and below. Particularly, such two cooling plates can be made of aluminum material which is highly thermally conductive, easy to mold and lightweight. However, the present disclosure is not limited to cooling plates with the above-mentioned materials, and they can be made of various materials such as metals other than aluminum.

The main frame 200 can comprise four sides to encompass the outer peripheral portions of an upper cooling plate 110 and a lower cooling plate 120. In other words, as shown in FIG. 1, the main frame 200 can form a rectangular ring with the center being empty when viewed downward from the above. In an empty space in a main frame 200, an upper cooling plate 110 can be exposed upward, and a lower cooling plate 120 can be exposed downward.

The main frame 200 can be manufactured by injection molding and the like, with an upper cooling plate 110 and a lower cooling plate 120 being interposed; however, the present disclosure is not limited to such manufacturing methods.

The main frame 200 can be configured to mount pouch-type secondary batteries. Particularly, the main frame 200 can be configured to mount the outer peripheral portions of pouch-type secondary batteries. For example, as shown in FIG. 1, the main frame 200 can comprise four unit frames with both ends being connected to adjacent unit frames. Therefore, the four sides of rectangular pouch-type secondary batteries can be respectively mounted on the four unit frames.

Here, pouch-type secondary batteries whose outer peripheral portions consist of four sides can be configured for all or some (for example, two sides) of the four sides to be mounted on a main frame 200.

Preferably, two pouch-type secondary batteries can be mounted on the main frame 200. In other words, an upper cooling plate 110 and a lower cooling plate 120 can be arranged vertically in the center of the main frame 200; two pouch-type secondary batteries can be respectively arranged on an upper portion of an upper cooling plate 110 and on a lower portion of a lower cooling plate 120, in a main frame 200. Therefore, when two or more of frames for secondary batteries are stacked vertically, two secondary batteries can be stored in each frame for secondary batteries.

Two or more of main frames 200 with the above configurations can be arranged to be stacked, and two or more of frames for secondary batteries can be stacked thereby. In other words, for the arrangement of a main frame 200 in FIG. 2, different main frames 200 can be stacked respectively above and below. When two or more of frames for secondary batteries are stacked in such manners, main frames 200 are arranged on an outer peripheral portion and cooling plates are arranged on an upper portion or a lower portion, with respect to secondary batteries.

On the other hand, the main frame 200 can comprise a protrusion vertically protruding and insertion grooves corresponding to such protrusions to facilitate the stacking of two or more. For example, the main frame 200 can comprise a protrusion protruding upward, as indicated by P in FIG. 2, on an upper portion of at least one among four unit frames. And, as indicated by G in FIG. 2, the main frame 200 can be arranged to comprise insertion grooves having a concave shape corresponding to the shape of the protrusions, on a lower portion of the unit frame. Here, when frames for secondary batteries are stacked vertically, the protrusions of a main frame 200 placed below can be inserted into the insertion grooves of a main frame 200 placed above. According to such embodiments, protrusions and insertion grooves can guide the stacking of main frames 200 (i.e., frames for secondary batteries), facilitating the process of stacking and stably maintaining the structure formed by such stacking thereafter through the coupling strength of the protrusions and the insertion grooves.

Preferably, the main frame 200 can comprise openings in the side surfaces, as indicated by O in FIG. 1 and FIG. 2. Here, openings are configured to penetrate through a main frame 200 horizontally, so that at least a portion of an empty space between an upper cooling plate 110 and a lower cooling plate 120 can be configured to be exposed outward. In other words, frames for secondary batteries for stacking according to the present disclosure, an empty space is formed between an upper cooling plate 110 and a lower cooling plate 120 to function as a channel, and the openings can expose such a channel formed between both cooling plates outward from the main frame 200. Therefore, air external to a main frame 200 can go into and out of a channel formed between two cooling plates via such openings.

Here, it is preferable to form at least two of the openings O for one main frame 200. Then, at least one opening functions as an inlet and the other opening can function as an outlet. For example, as shown in FIG. 1, where a main frame 200 comprises four unit frames, which are respectively placed horizontally at front, rear, left and right locations, openings can be respectively formed on a left frame and a right frame. Here, an opening formed on a right frame can function as an inlet, and an opening formed on a left frame can function as an outlet. Therefore, as shown by a dotted arrow in FIG. 1, external air flown into the opening of a right unit frame flows along a channel between two cooling plates while performing heat exchange with secondary batteries via cooling plates. And, air which has performed such heat exchange with cooling plates can be discharged from a main frame 200 to the outside via the opening of a left frame.

On the other hand, where the main frame 200 comprises two or more of openings, it is preferable to form at least two openings at opposite sides. For example, like the above embodiments, two openings can be respectively formed on a left frame and a right frame, or two openings can be respectively formed on a front frame and a rear frame. According to such embodiments, the inlet and the outlet of a channel are formed on opposite sides, so that the channel along which a fluid flows can be linear. Therefore, such configurations allow a fluid to go into and out of a main frame smoothly and quickly, and enhance cooling efficiency by flowing a fluid across the whole section of a channel formed between cooling plates.

The support member 300 is arranged between two cooling plates to support both cooling plates. In other words, as shown in FIG. 2, the support member 300 is arranged between an empty space between an upper cooling plate 110 and a lower cooling plate 120, with the upper ends being in contact with lower portions of the upper cooling plates 110 and the lower ends being in contact with upper portions of the lower cooling plate 120. Therefore, the support member 300 can support an upper cooling plate 110 upward and a lower cooling plate 120 downward.

Particularly, the support member 300 can be configured to keep the distance between an upper cooling plate 110 and a lower cooling plate 120 within a predetermined range. For example, the support member 300 can be configured to keep constant the distance between an upper cooling plate 110 and a lower cooling plate 120. According to such configurations in the present disclosure, it is possible to prevent the empty space between an upper cooling plate 110 and a lower cooling plate 120 from being narrowed so that a channel can be prevented from being constricted and blocked, ensuring a smooth flow of a fluid via a channel. Also, according to such configurations in the present disclosure, it is possible to prevent the distance between an upper cooling plate 110 and a lower cooling plate 120 from being widened, preventing cooling plates from exerting force upon secondary batteries and in turn disrupting the arrangement of secondary batteries assembled within a battery module.

The support member 300 is structures to support an upper cooling plate 110 and a lower cooling plate 120, and are preferably made of materials having more than or equal to a predetermined mechanical rigidity. For example, the support member 300 can be made of metal material such as steel or in plastic material.

Particularly, the support member 300 can be configured to be coupled with at least one of an upper cooling plate 110 and a lower cooling plate 120, so as to be fixed and unmovable therebetween.

Figure 3:
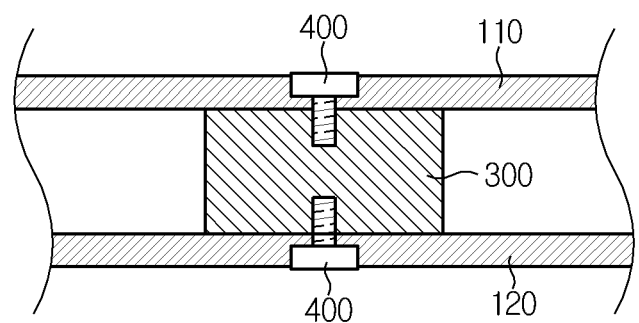
FIG. 3 is a cross-sectional view of a configuration of a support member and cooling plates being coupled according to one embodiment of the present disclosure.

FIG. 3 is a cross-sectional view of a configuration of a support member 300 and cooling plates being coupled according to one embodiment of the present disclosure. For example, the configuration of FIG. 3 may be one form of a cross-section for the portion A in FIG. 1.

With reference to FIG. 3, the support member 300 can be arranged to be coupled with an upper cooling plate 110 and a lower cooling plate 120, by coupling members 400. Here, coupling members with various shapes such as rivets and bolts to couple two parts mutually can be used for such coupling members 400. For example, as shown in FIG. 3, a support member 300 can be coupled with cooling plates by two of coupling members 400. Here, one coupling member 400 can be penetrated through an upper cooling plate 110 and inserted and coupled with an upper portion of a support member 300; the other coupling member 400 can be penetrated through a lower cooling plate 120 and inserted and coupled with a lower portion of a support member 300. According to such embodiments of the present disclosure, coupling members 400 can fix a support member 300 to be unmovable between an upper cooling plate 110 and a lower cooling plate 120, stably maintaining a channel to have a constant shape.

Figure 4:
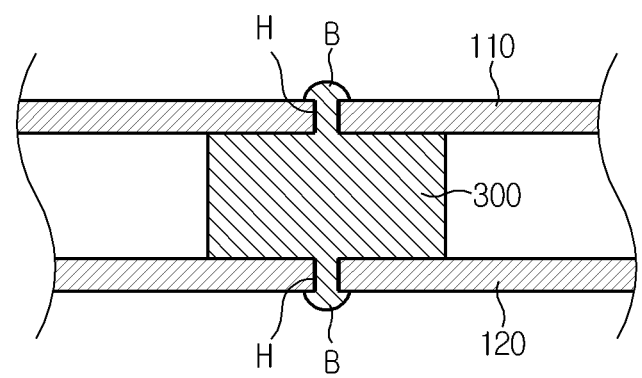
FIG. 4 is a cross-sectional view of a configuration of a support member and cooling plates being coupled according to another embodiment of the present disclosure.

FIG. 4 is a cross-sectional view of a configuration of a support member 300 and cooling plates being coupled according to another embodiment of the present disclosure. For example, the configuration of FIG. 4 may be the other form of a cross-section for the portion A in FIG. 1.

With reference to FIG. 4, as indicated by B, a support member 300 can comprise a protrusion protruding upward and downward on the upper portions and/or on lower portions, and as indicated by H, holes can be formed on an upper cooling plate 110 and on a lower cooling plate 120. The protrusions on a support member 300 can be inserted and coupled with the holes on cooling plates, so that an upper cooling plate 110 and a lower cooling plate 120 can be coupled and fixed with a support member 300.

As shown in many of the attached drawings, the support member 300 can be configured to have flat surfaces which are in contact with an upper cooling plate 110 and/or a lower cooling plate 120.

In other words, a support member 300 comprise upper surfaces which are in contact with lower portions of an upper cooling plate 110 and lower surfaces which are in contact with upper portions of a lower cooling plate 120. Here, lower portions of an upper cooling plate 110 and upper portions of a lower cooling plate 120 can be formed to be flat; accordingly, a support member 300 can be configured to comprise upper surfaces and lower surfaces which are flat to correspond respectively to the lower surface of an upper cooling plate 110 and the upper surface of a lower cooling plate 120.

According to such configurations in the present disclosure, a support member 300 come in surface contact with cooling plates to enlarge the contact area between a support member 300 and cooling plates. Therefore, a support member 300 can support enlarged portions for an upper cooling plate 110 and a lower cooling plate 120 more stably, improving fixing strength of a support member 300 and preventing the deformation of cooling plates more effectively.

Figure 5:
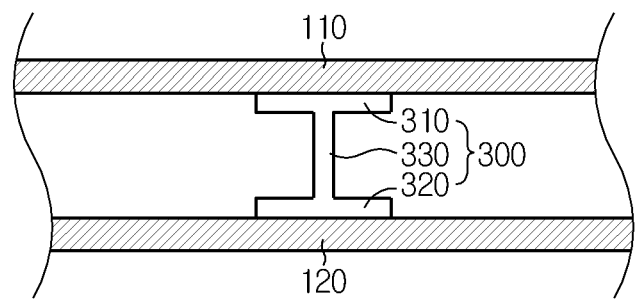
FIG. 5 to FIG. 7 are cross-sectional views of a configuration of a support member and cooling plates being coupled according to still other embodiments of the present disclosure.
Figure 6:
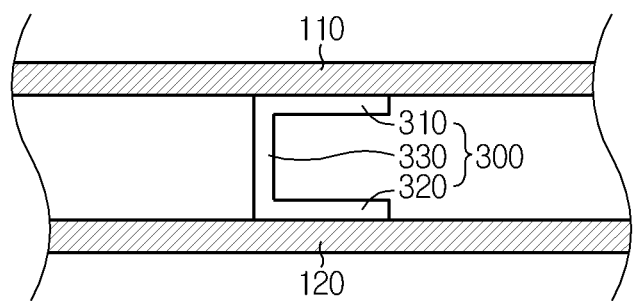
Figure 7:
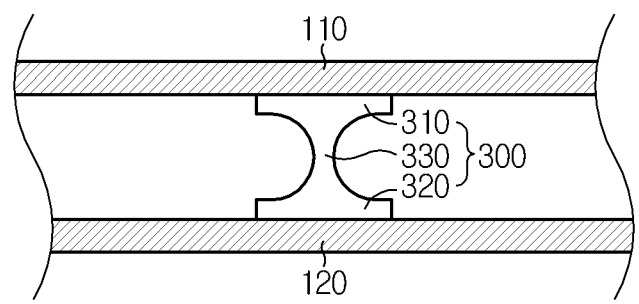

FIG. 5 to FIG. 7 are cross-sectional views of an configurations of a support member 300 and cooling plates being coupled according to still other embodiments of the present disclosure.

With reference to FIG. 5 to FIG. 7, a support member 300 can comprise an upper support part 310 which is in contact with the lower surface of an upper cooling plate 110, a lower support part 320 which is in contact with the upper surface of a lower cooling plate 120, and a connecting part which connects upper support part 310 and lower support part 320 to each other.

Here, an upper support part 310 and a lower support part 320 can be configured to comprise respectively flat upper surfaces and flat lower surfaces which are in contact with cooling plates. Particularly, an upper support part 310 and a lower support part 320 can respectively be configured in plates whose upper surfaces and lower surfaces are both flat.

And a connecting part can support an upper support part 310 or a lower support part 320 by being placed therebetween while keeping the distance therebetween constant. Particularly, a connecting part can be formed to have a thickness (a length in the leftward/rightward direction in the drawing) less than that of an upper support part 310 or a lower support part 320.

According to such configurations in the present disclosure, a support member 300 can come in stable contact with cooling plates through the enlarged contact area by an upper support part 310 and a lower support part 320 which have a larger thickness, while a connecting part having a thinner thickness can enlarge a cooling channel. Therefore, a support member 300 can enlarge a cooling channel stably.

On the other hand, as shown in FIG. 5, a connecting part of a support member 300 can be located at the center of an upper support part 310 and a lower support part 320 horizontally (left and right in the drawing). In such configurations, a support member 300 can be formed to be "I"-shaped. According to such configurations in the present disclosure, a connecting part can allow an upper support part 310 and a lower support part 320 to support the whole portion relatively uniformly and stably.

Still, a connecting part can be arranged at locations other than described. For example, as shown in FIG. 6, a connecting part can be arranged at left or right ends of an upper support part 310 and a lower support part 320. According to such configurations in the present disclosure, an upper support part 310 and a lower support part 320 can be coupled by more enlarged portions with which coupling members 400 such as rivets or bolts are coupled, thereby facilitating the process of coupling by such coupling members 400 and improving the coupling strength therefor.

Also, a connecting part can be configured, so that portions coupled with an upper support part 310 and a lower support part 320 can be formed to have a thickness more than that of other portions. For example, as shown in FIG. 7, a connecting part can be configured, so that portions coupled with an upper support part 310 are formed to have a larger thickness, which decreases toward the center and increases thereafter, and portions coupled with a lower support part 320 are in turn formed to have a larger thickness again. Particularly, a support member 300 can be configured, so that upper portions and lower portions are formed to have the largest thickness, which decreases toward the center. According to such configurations in the present disclosure, a connecting part can be formed to have a smaller thickness around the center so as to enlarge a cooling channel, and a relatively larger thickness at the upper ends and lower ends to improve support strength for an upper support part 310 and a lower support part 320.

Preferably, for a frame for secondary batteries for stacking according to the present disclosure, two or more of the support members 300 can be arranged, as shown in FIG. 1 and FIG. 2. And, such a plurality of support members 300 can be arranged to be spaced apart horizontally by a predetermined distance from each other in a space between two cooling plates. According to such configurations in the present disclosure, a plurality of support members 300 can stably support an upper cooling plate 110 and a lower cooling plate 120 across the whole portion thereof.

Particularly, where three or more of support members 300 are arranged, it is preferable to arrange the distance respectively among support members 300 to be equal. According to such embodiments, an upper cooling plate 110 and a lower cooling plate 120 can be supported uniformly across the whole portion, and support member 300 can thus prevent the deformation of cooling plates more effectively.

Figure 8:
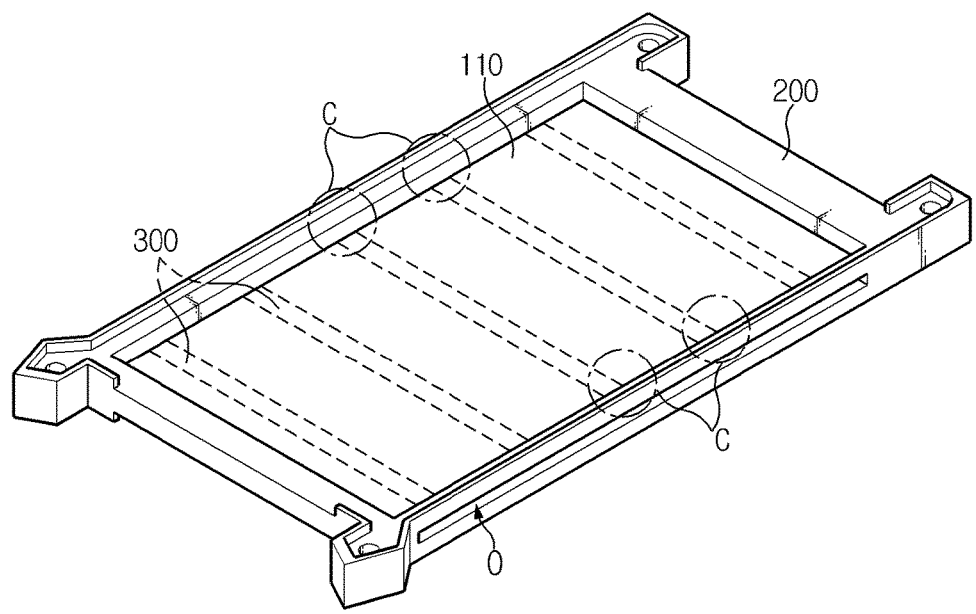
FIG. 8 is a schematic view of a configuration and layout of support member according to one embodiment of the present disclosure.

FIG. 8 is a schematic view of a configuration and layout of support member 300 according to one embodiment of the present disclosure. In FIG. 8, for convenience of description, support member 300 placed below upper cooling plates 110 will be indicated by dotted lines.

With reference to FIG. 8, support member 300 can be formed to elongate in one direction. Here, support member 300 can be arranged for the longitudinal direction to be horizontal. Especially, a support member 300 can be arranged such that the longitudinal direction corresponds to a direction of a channel, i.e., the flow direction of a fluid. For example, in the arrangement in FIG. 8, where openings are respectively formed on a left side and on a right side of a main frame 200, a channel is formed leftward and rightward; support member 300 are then formed to elongate leftward and rightward such that the longitudinal direction corresponds to the direction of the channel. According to such embodiments, since support member 300 are formed to elongate in the flow direction of a fluid in a channel, the flow of a fluid will not be disrupted by support member 300 and furthermore be guided thereby to be flown more smoothly.

Here, a plurality of such support members 300 formed to elongate in one direction can be comprised and be arranged to be perpendicular to the direction of a channel. For example, as shown in FIG. 8, where five of support members 300 are comprised in a frame for secondary batteries, such support member 300 can be respectively arranged to be perpendicular to the direction of a channel (i.e., extended frontward and reward) and spaced apart by a predetermined distance from each other.

Also preferably, at least a portion of the support member 300 can be arranged on the outer peripheral portions, where a main frame 200 is placed, of cooling plates.

For example, as indicated by C in FIG. 8, support member 300 can be arranged around the outer peripheral portions of an upper cooling plate 110 and a lower cooling plate 120, for example, where a main frame 200 is placed above and below. An upper cooling plate 110 and a lower cooling plate 120 are liable to being deformed around the outer peripheral portions, (i.e., the perimeter of cooling plates). According to such embodiments in the present disclosure, support member 300 can support the outer peripheral portions of such cooling plates, preventing the deformation of the outer peripheral portions of cooling plates and thus preventing a channel being blocked or other related issues.

Figure 9:
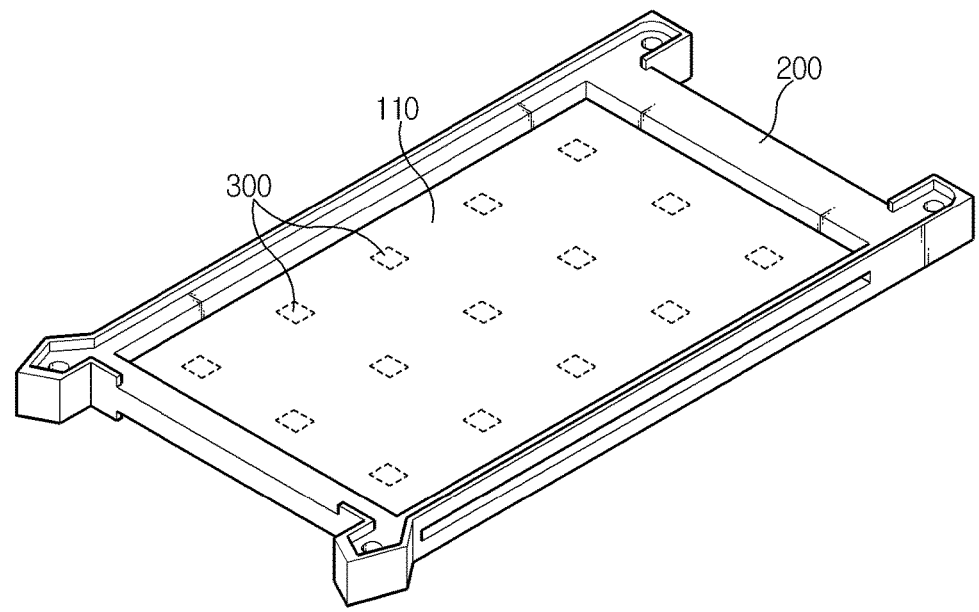
FIG. 9 is a schematic view of a configuration and layout of support member according to another embodiment of the present disclosure.

FIG. 9 is a schematic view of a configuration and layout of support member 300 according to another embodiment of the present disclosure. In FIG. 9, like FIG. 8, support member 300 will also be indicated by dotted lines. Hereinafter, description will be mainly given to aspects in FIG. 9 which are different from the arrangement in FIG. 8, and detailed description will be omitted for similar aspects to which the arrangement in FIG. 8 can be applied.

With reference to FIG. 9, the support member 300 can be arranged to extend frontward/rearward and leftward/rightward, in a similar length for both directions, rather than elongate in one specific direction. Here, a plurality of the support members 300 can be arranged and spaced apart by a predetermined distance from each other across the whole portion of cooling plates to support the cooling plates. Particularly, a plurality of the support members 300 can be arranged not only in the direction perpendicular to a channel but also in the same direction as that of the channel. In other words, in the embodiment in FIG. 9, a plurality of support members 300 can be arranged not only to be spaced apart by a predetermined distance from each other in the direction perpendicular to a channel (frontward/rearward) but also to be spaced apart by a predetermined distance from each other in the same direction as that of the channel (leftward/rightward).

Figure 10:
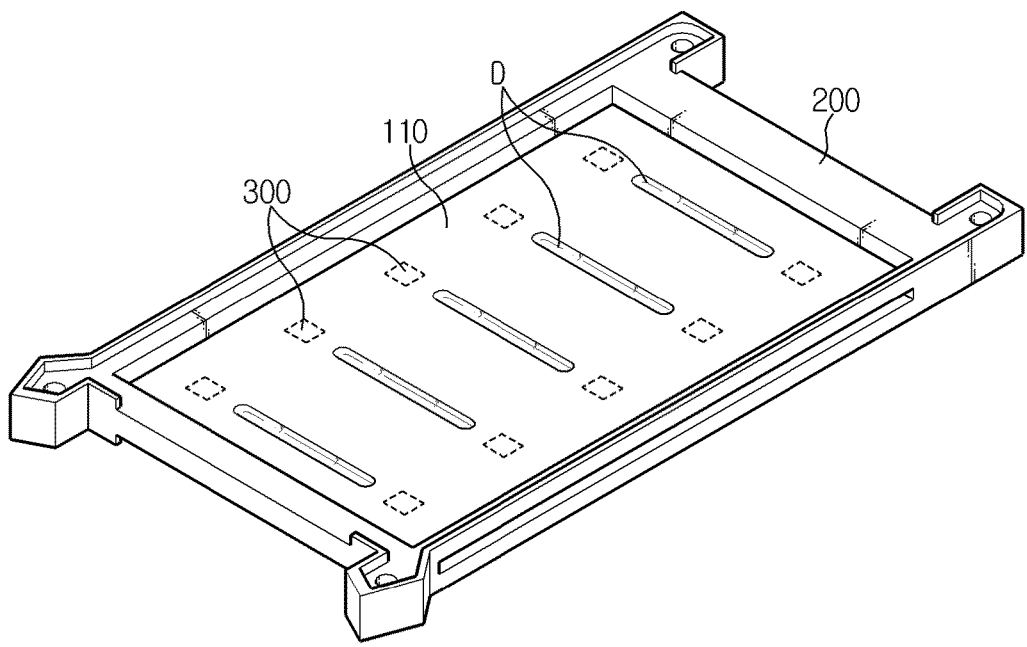
FIG. 10 is a schematic view of a configuration and layout of support member according to still another embodiment of the present disclosure.

FIG. 10 is a schematic view of a configuration and layout of support member 300 according to still another embodiment of the present disclosure. In FIG. 10, like FIG. 8, support member 300 will also be indicated by dotted lines, and description will be given to aspects different from the description already given.

With reference to FIG. 10, an upper cooling plate 110 can comprise beads formed thereon, as indicated by D. Though not shown in FIG. 10, a lower cooling plate 120 can also comprise beads formed thereon corresponding to the bead shape of an upper cooling plate 110. Here, beads D can be configured to protrude toward the other cooling plate. In other words, beads formed on an upper cooling plate 110 can be formed to protrude downward, while beads formed on a lower cooling plate 120 can be formed to protrude upward. Here, beads formed on an upper cooling plate 110 can be configured to be in contact with beads formed on a lower cooling plate 120.

On the other hand, as shown in FIG. 10, such beads can be formed to elongate in one direction, with the longitudinal direction being parallel to the direction of a channel.

As shown in FIG. 10, a plurality of such beads can be formed on an upper cooling plate 110 and/or a lower cooling plate 120. Here, beads can be arranged to be spaced apart by a predetermined distance horizontally, particularly in the direction perpendicular to a channel.

In such embodiments where beads are formed on an upper cooling plate 110 and/or on a lower cooling plate 120, support member 300 can be arranged on the portions where beads are not formed. Particularly, as shown in FIG. 10, support member 300 can be arranged to be spaced apart by a predetermined distance from the opposite ends of beads which are formed to elongate in one direction, in the direction toward a channel. According to such configurations in the present disclosure, support member 300 are arranged to be where beads are not formed, i.e., especially the outer peripheral portions of cooling plates are placed, supporting a space between cooling plates and thus preventing a channel therearound from being constricted.

A battery module according to the present disclosure comprises a plurality of the frames, described above, for secondary batteries.

Figure 11:
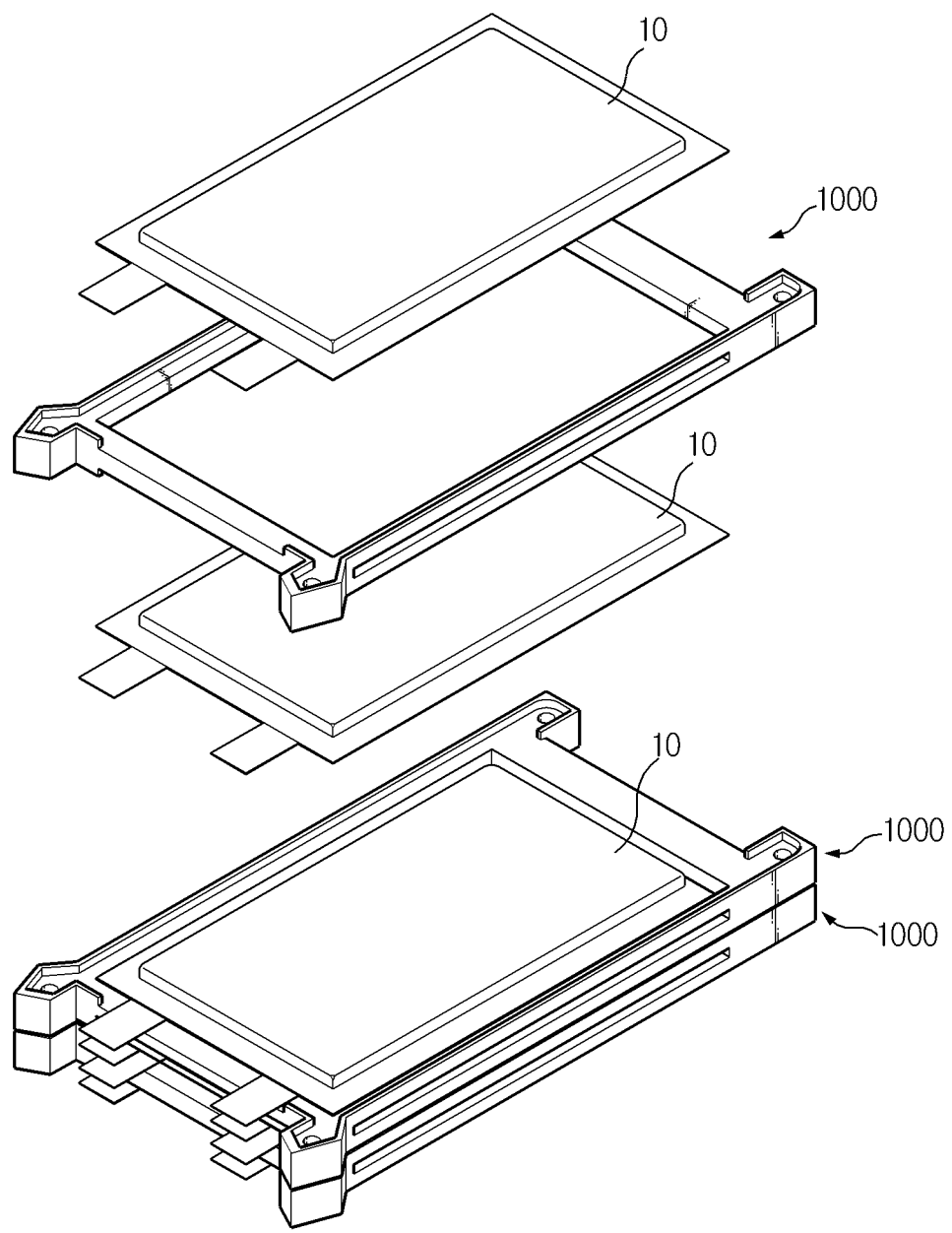
FIG. 11 is a schematic view of a configuration of a battery module according to one embodiment of the present disclosure.

FIG. 11 is a schematic view of a configuration of a battery module according to one embodiment of the present disclosure.

With reference to FIG. 11, a battery module according to the present disclosure can comprise a plurality of pouch-type secondary batteries 10 along with a plurality of frames for secondary batteries 1000. Here, frames for secondary batteries 1000 can be stacked vertically, and inner spaces formed thereby can store pouch-type secondary batteries 10. Particularly, a battery module according to the present disclosure can be configured to store two pouch-type secondary batteries 10 for each frame for secondary batteries 1000.

A battery pack according to the present disclosure can comprise one or more battery modules according to the present disclosure. And, such battery modules can comprise a plurality of the frames, described above, for secondary batteries according to the present disclosure. Also, a battery pack according to the present disclosure can further comprise, in addition to such battery modules, a case to store the same, and various devices to control charging/discharging thereof, for example, battery management system (BMS), a current sensor, a fuse, etc.

Frames for secondary batteries according to the present disclosure can be applied to vehicles such as electric cars or hybrid cars. In other words, vehicles according to the present disclosure can comprise a battery pack according to the present disclosure, which can in turn comprise frames for secondary batteries.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Also, while the present specification includes terms to indicate directions, such as upper, lower, above, below, left, right, front, rear and the like, such terms are just for convenience of description, and it will become apparent to those skilled in the art that such terms may be different depending on the locations of objects and observers.

What is claimed is:

1. A frame for secondary batteries, comprising:
an upper cooling plate and a lower cooling plate spaced apart by a predetermined distance from each other facing each other such that a channel is formed between the upper cooling plate and the lower cooling plate;
a main frame having four sides and configured to encompass the outer peripheral portions of the upper cooling plate and the lower cooling plate, to mount the outer peripheral portions of pouch-type secondary batteries thereto, and to enable two or more main frames to be stacked; and
a plurality of spaced apart support members arranged between the upper cooling plate and the lower cooling plate to support the upper and lower cooling plates,
wherein each support member is mechanically fixed to the upper and lower cooling plates,
wherein each support member is separate from one another, and
wherein each support member is formed to elongate in one direction such that a longitudinal direction of the support member corresponds to a direction of the channel.

2. The frame for secondary batteries of claim 1, wherein the main frame comprises openings formed in the side surfaces thereof to open at least a portion of an empty space between the upper cooling plate and the lower cooling plate.

3. The frame for secondary batteries of claim 1, wherein the main frame is configured to mount one pouch-type secondary battery on an upper portion of the upper cooling plate, and another pouch-type secondary battery on a lower portion of the lower cooling plate.

4. The frame for secondary batteries of claim 1, wherein the plurality of support members is configured to keep the distance between the upper cooling plate and the lower cooling plate within a predetermined range.

5. The frame for secondary batteries of claim 1, wherein each support member is mechanically fixed by a coupling member to the upper cooling plate and the lower cooling plate.

6. The frame for secondary batteries of claim 1, wherein each support member comprises protrusions,
wherein each support member extends through a respective hole in the upper and lower cooling plates, and
wherein the protrusions mechanically fixed the respective support member to the upper and lower cooling plates.

7. The frame for secondary batteries of claim 1, wherein the support member is made of metal material or plastic material.

8. The frame for secondary batteries of claim 1, wherein the upper cooling plate includes a plurality of spaced apart beads protruding towards and contacting corresponding beads formed on the lower cooling plate, and
wherein the beads are elongate in one direction.

9. The frame for secondary batteries of claim 8, wherein each bead is arranged such that a longitudinal direction thereof corresponds to the direction of the channel.

10. The frame for secondary batteries of claim 9, wherein a group of support members of the plurality of support members are arranged on outer peripheral portions of the upper and lower cooling plates, and
wherein the plurality of support members is spaced from the plurality of beads.

11. The frame for secondary batteries of claim 1, wherein each support member comprises a flat upper surface and a flat lower surface.

12. The frame for secondary batteries of claim 1, wherein each support member comprises an upper support part which is in contact with the lower surface of the upper cooling plate, a lower support part which is in contact with the upper surface of the lower cooling plate, and a connecting part which mechanically fixes the upper support part and the lower support part to each other.

13. A battery module comprising the frame for secondary batteries according to claim 1 and at least one secondary battery provided within the frame.

14. A battery pack comprising the frame for secondary batteries according to claim 1 in plurality and at least one secondary battery provided within each frame.

15. A vehicle comprising the frame for secondary batteries according to claim 1 and at least one secondary battery provided within the frame.

16. The frame for secondary batteries of claim 1, wherein each support member passes through the upper and lower cooling plates.

* * * * *